(12) United States Patent
Lemmon et al.

(10) Patent No.: US 7,445,937 B2
(45) Date of Patent: Nov. 4, 2008

(54) METHODS FOR SYNTHESIS AND EVALUATION OF HYDROGEN STORAGE COMPOSITIONS

(75) Inventors: John Patrick Lemmon, Schoharie, NY (US); Ji-Cheng Zhao, Latham, NY (US); Tracey Marie Jordan, Schenectady, NY (US); Vincent Scott Smentkowski, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 841 days.

(21) Appl. No.: 10/881,940

(22) Filed: Jun. 29, 2004

(65) Prior Publication Data

US 2005/0287676 A1    Dec. 29, 2005

(51) Int. Cl.
*G01N 33/48* (2006.01)
*G01N 33/00* (2006.01)
*G01N 24/00* (2006.01)
*G01N 33/53* (2006.01)

(52) U.S. Cl. .................. 436/144; 436/63; 436/173; 436/815

(58) Field of Classification Search ............ 436/63, 436/144, 173, 815
See application file for complete search history.

(56) References Cited

U.S. PATENT DOCUMENTS

| | | | |
|---|---|---|---|
| 5,198,043 A | 3/1993 | Johnson | 148/512 |
| 5,460,745 A * | 10/1995 | Lee | 252/182.32 |
| 6,080,381 A | 6/2000 | Zaluska et al. | 423/648.1 |
| 6,572,828 B1 | 6/2003 | Potyrailo et al. | |
| 6,684,161 B2 | 1/2004 | Cawse | |
| 2002/0083643 A1* | 7/2002 | Amendola et al. | 48/61 |
| 2003/0009942 A1 | 1/2003 | Amendola et al. | 48/61 |
| 2003/0037487 A1 | 2/2003 | Amendola et al. | 48/76 |
| 2004/0023595 A1* | 2/2004 | Ping et al. | 451/6 |

FOREIGN PATENT DOCUMENTS

WO    WO 98 15986    4/1998
WO    WO 02/46130    6/2002

OTHER PUBLICATIONS

A.Zaluska, L.Zaluski, J.O.Strom-Olsen. Sodium alanates for reversible hydrogen storage. Journal of Alloys and Compounds 298 (2000) 125-134.*

Andrew W. McClaine et al., "Hydrogen Transmission/Storage With Metal Hydride-Organic Slurry and Advanced Chemical Hydride/Hydrogen for PEMFC Vehicles", Proceedings of the 200 US DOE Hydrogen Program Review, NREL/CP-570-28890, 14 pages, 2000.

Thomas F. Jaramillo et al., "High-Throughput Screening System for Catalytic Hydrogen-Producing Materials", American Chemical Society, J. Comb. Chem., vol. 4, pp. 17-22, 2002.

* cited by examiner

*Primary Examiner*—Jill Warden
*Assistant Examiner*—Keri A Moss
(74) *Attorney, Agent, or Firm*—Shawn A. McClintic

(57) ABSTRACT

A method for identification and evaluation of the hydrogen storage capacity of materials is presented, the method comprising providing a plurality of materials, wherein the plurality of materials comprise an array of synthesized hydrides and analyzing hydrogen content in the plurality of materials.

21 Claims, 1 Drawing Sheet

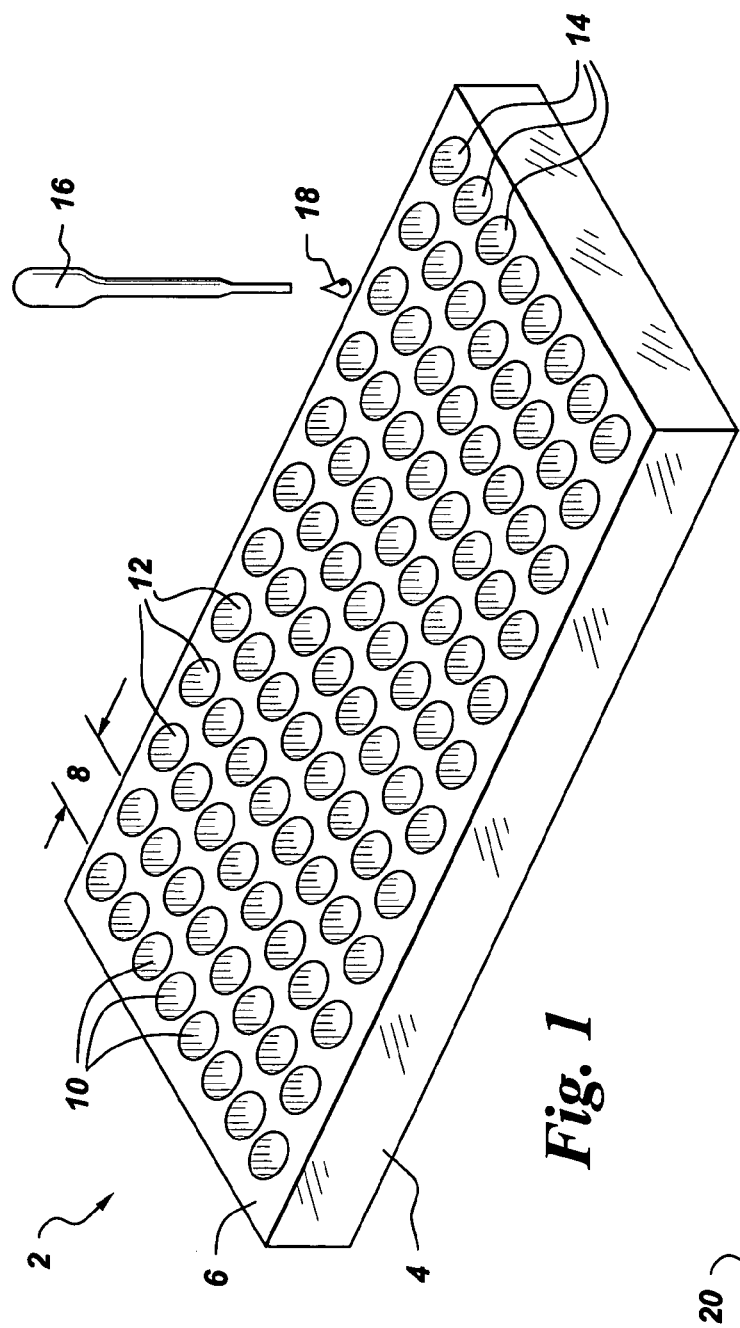
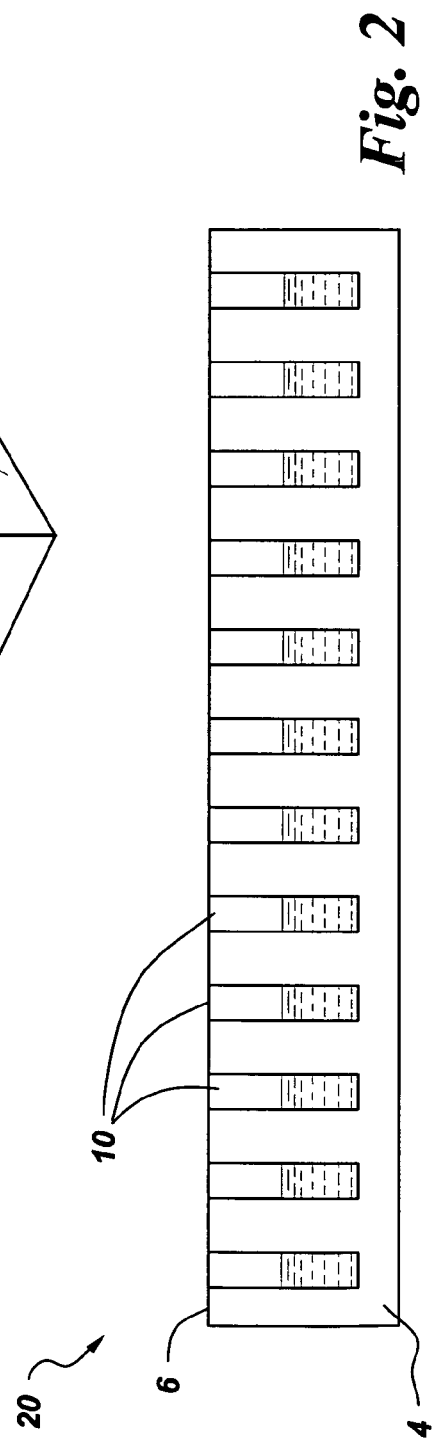

METHODS FOR SYNTHESIS AND EVALUATION OF HYDROGEN STORAGE COMPOSITIONS

BACKGROUND OF THE INVENTION

This disclosure is related to methods for rapid evaluation and selection of hydrogen storage compositions.

Hydrogen is considered to be an ideal fuel for fuel cell vehicles. Typically, hydrogen fuel cells operate by converting the chemical energy in hydrogen and oxygen into water, producing electricity and heat, which electricity is then fed into an electric motor that power a fuel cell vehicle. Pure hydrogen is also a desired for internal combustion engine (ICE) powered vehicles, since it will not produce carbon dioxide, a compound that is widely recognized as the cause of green-house effect. Hydrogen fuel also reduces the emission of aerosol, another pollutant to urban air.

Hydrogen is the most plentiful element in the universe, and is the third most plentiful element on Earth. Hydrogen can be derived from multiple renewable energies. Means of storing hydrogen for end use delivery include: (1) liquid hydrogen, (2) compressed hydrogen, and (3) solid hydrogen storage (i.e., metal hydrides).

Using liquid or gaseous hydrogen as the energy source in a fuel cell is not ideal. Hydrogen is highly flammable and only requires a low hydrogen-to-air concentration for combustion. Furthermore, liquid hydrogen is harder to transport and store than other liquid fuel. Other problems with liquid and gaseous hydrogen storage include low volumetric density, high pressure storage, and high energy cost to compress or liquefy hydrogen. Additionally, there is currently only a very limited infrastructure available for distributing hydrogen to the public.

Solid hydrogen storage materials that chemically store the hydrogen fuel are considered to be an advantageous source of hydrogen for fuel cells, ICEs and in a wide range of potential applications. However, currently known storage materials are generally fraught with deficiencies in one or more desirable characteristics, such as, for example, low storage capacity for hydrogen, unfavorable thermodynamics and/or kinetics for hydrogen absorption and desorption. Therefore, improved hydrogen storage materials are desired for a variety of applications, including fuel cells for vehicles, personal power generation, and stationary power generation.

Extensive research activity in the past 30 or so years has focused on storing hydrogen in the form of solid metal hydrides. Metal hydrides are typically generated exothermically when metals and alloys are exposed to hydrogen. Most often, the hydrogen reacts with these metals or alloys and forms new compounds. The hydrogen can be recovered for use by heating, by electrolytic oxidation of the hydride, or by a reaction with an oxide or water. One advantage of using a metal hydride for hydrogen storage is that the volumetric density for hydrogen storage in metal hydrides is relatively high in comparison to other storage methods.

Examples of well-known hydrogen storage materials include metal hydrides, such as $FeTiH_2$ and $LaNi5H_6$, which hydrides release hydrogen upon heating. Even though $FeTiH_2$ and $LaNi5H_6$ have acceptable hydrogen cycling temperatures, the hydrogen content in terms of weight percent is too low for use in vehicular fuel cell applications. Other metal hydrides, such as $MgH_2$ and $TiH_2$, have higher hydrogen contents, about 7.6 and about 4.0 percent by weight respectively, but must be heated to high temperatures (i.e., above about 300° C.) in order to recover the hydrogen. The preparation of materials for use as hydrogen storage media analyzing them for their potential hydrogen storage capacity is a time consuming process.

In view of the above, there is a need for safer, more effective methods of storing and recovering hydrogen. In addition, there is a desire to minimize the overall system volume and weight. There is also a need for a rapid synthesis and evaluation method for determining the hydrogen storage capacity in any material to facilitate new material discovery in the field of hydrogen storage.

BRIEF DESCRIPTION OF THE INVENTION

One aspect of the invention is a method for identification and evaluation of the hydrogen storage capacity of materials. The method comprises providing a plurality of materials, wherein the plurality of materials comprises an array of synthesized hydrides, and analyzing hydrogen content in the plurality of materials.

In another embodiment, a method for identification and evaluation of the hydrogen storage capacity of a plurality of materials comprises providing a plurality of materials, wherein the plurality of materials comprises an array of synthesized borohydrides; and adding at least one precursor material wherein the at least one precursor material is selected from the group consisting of $SiO_2$, $Al_2O_3$, $Nb_2O_3$, $TiO_2$, $Cr_2O_7$, $Cr_2O_3$, $Fe_2O_3$, $MnO_2$, $CuO$ and $ZnO$. The method further comprises mixing the synthesized borohydrides and the at least one precursor material. The method further includes analyzing hydrogen content in the plurality of materials.

In yet another aspect, a method for identification and evaluation of the hydrogen storage capacity of a plurality of materials comprises providing a plurality of materials, wherein the plurality of materials comprises an array of synthesized alanates; and adding at least one precursor material wherein the at least one precursor material is selected from the group consisting of $SiO_2$, $Al_2O_3$, $Nb_2O_3$, $TiO_2$, $Cr_2O_7$, $Cr_2O_3$, $Fe_2O_3$, $MnO_2$, $CuO$ and $ZnO$. The method further comprises mixing the synthesized alanates and the at least one precursor materials and analyzing hydrogen content in the plurality of materials.

DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a perspective view of an exemplary apparatus for synthesis and evaluation hydrogen storage material; and FIG. 2 shows a cross-sectional view of the exemplary apparatus shown in FIG. 1.

DETAILED DESCRIPTION OF THE INVENTION

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

Disclosed herein are methods for rapidly evaluating the hydrogen storage capacity of a plurality of materials. The method comprises providing a plurality of materials, wherein the plurality of the materials comprises an array of synthesized hydrides. The methods described herein are characterized by parallel preparation of the plurality of materials at a micro scale. Advantageously, a large number of materials considered for hydrogen storage can be rapidly screened and analyzed in a single batch experiment, thereby saving valuable time and capital cost of doing each experiment separately in a large scale. This high efficiency methodology facilitates the creation of a controlled compositional variation in a large number of samples for fast and systematic surveys of bulk properties of the materials to be tested for hydrogen storage capability.

In one embodiment, the provided plurality of materials comprises at least two precursor materials. One of the precursor materials is a metal hydride. Such hydrides may have ionic, covalent, metallic bonding or bonding comprising a combination of at least one of the foregoing types of bonding. These hydrides preferably have a hydrogen-to-metal atom ratio of greater than or equal to about 1. The reaction between a metal and hydrogen to form a hydride is generally a reversible reaction and takes place according to the following generalized equation (I):

$$M + (x/2)H_2 \leftrightarrow MH_x \qquad (I)$$

Complex metal hydrides can store up to about 18.4 weight percent (wt %) of hydrogen, and have high volumetric storage densities. Complex metal hydrides generally consist of a H=M complex, where M is a metal and H is hydrogen. The process of hydrogen adsorption, absorption or chemisorption results in hydrogen storage and is hereinafter, for the sake of simplicity, referred to as sorption, while the process of desorption, and in some cases decomposition, results in the generation of hydrogen.

Some of the non-limiting examples of hydrides include, but are not limited to, alkali metal borohydrides, alkali metal alanates, alkaline earth borohydrides, alkaline earth alanates, mixtures of transition metal with alkali and/or alkaline earth metals with borohydride or alanates, mixtures of metals with both borohydride and alanate anions. In some embodiments, stable complex metal hydride is mixed with unstable complex hydrides to achieve a more favorable decomposition and rehydrogenation conditions. In certain embodiments, the synthesized hydrides are formed by a solid state method wherein powder mixtures of hydrides are reacted to form the synthesized hydrides, through heating the powder mixture, or ball milling the mixture, or applying other energy transfer techniques. In some embodiments, the synthesized hydrides are made through a solution synthesis method. In the solution synthesis method, the provided plurality of materials comprises at least two precursor materials wherein at least one precursor material is a solvent, such as, for example, an ether or tetrahydrofuran (THF). In some embodiments, ethers, diglymesethers, hexanes, or toluene are used as the solvent. The solvent is used to dissolve, or to form a slurry of, the metal hydrides with any other precursor material present in the plurality of the materials.

In some embodiments, the plurality of materials further comprises at least one of a compound selected from the group consisting of inorganic salts, and/or organometallic complexes, and combinations thereof.

In some embodiments, the plurality of materials comprises at least one of a compound selected from the group consisting of silica ($SiO_2$), aluminum oxide ($Al_2O_3$), niobium oxide ($Nb_2O_3$), titanium oxide ($TiO_2$), dichromate ($Cr_2O_7$), chromate ($Cr_2O_3$), ferric oxide ($Fe_2O_3$), manganese oxide ($MnO_2$), copper oxide (CuO), zinc oxide (ZnO), and combinations thereof.

In one embodiment, the provided plurality of materials comprises an array of synthesized borohydrides or alanates. In the solid state method of preparing the synthesized hydrides, at least one precursor material is added, which precursor is selected is selected from the group consisting of $SiO_2$, $Al_2O_3$, $Nb_2O_3$, $TiO_2$, $Cr_2O_7$, $Cr_2O_3$, $Fe_2O_3$, $MnO_2$, CuO and ZnO. In the solution synthesized method a solvent is further added to the plurality of the materials.

FIG. 1 shows an exemplary apparatus 2 to evaluate the hydrogen storage capacity of a plurality of the materials. The exemplary apparatus 2 is used for conducting rapid evaluation of a large number of compositions in one single batch experiment. The apparatus 2 comprises a substrate 4 comprising at least one substrate reservoir 10. As shown in FIG. 1, the substrate 4 is a block having a plurality of discrete substrate reservoirs 10 adapted to receive the precursors. The reservoirs 10 are arranged in columns 12 and rows 14. The distance 8 between each discreet reservoir is selected to allow differentiation in the performance analysis of one reservoir with respect to the other. Those skilled in the art will appreciate that the substrate should be made of a material that is stable to the chemistry of the precursors. In one embodiment, substrate reservoirs 10 are in a shape of a partial sphere or cylinder and sized to allow the precursors to be added and mixed in-situ. The diameter of the reservoirs 10 is generally about 1 to about 10 millimeters. The number of reservoirs can be determined based on the number of materials to be screened in one batch of experiment.

FIG. 2 shows the cross-sectional view 20 of the exemplary apparatus as shown in FIG. 1. Each reservoir 10 is filled with the compositions 22 containing the precursors described in the preceding sections. The depth of the reservoirs is sufficient to contain all the precursors. In an exemplary method as disclosed herein, the first precursor of metal hydride is added to each of the reservoir 10. In one embodiment, a calculated amount of a metal hydride powder is transferred to each reservoir. In another embodiment, each reservoir 10 contains one or more metal hydride powders. Addition of pre-calculated amount of one or more metal hydride powders may be achieved by adding the metal hydride powder individually to each reservoir 10. Alternatively the metal hydride powder in all the reservoirs may be added simultaneously using an automated system.

In some embodiments, once the metal hydride powder is transferred into the reservoirs 10, a second precursor, for example, a solvent, is added to each reservoir. Furthermore in some embodiments, other precursors are added to each reservoir to make the final desired composition. The amount of each of these precursors 18 may be pre-calculated and added manually using a pipette 16 or in automated mode. The combination and concentration of precursors added to each reservoir can be varied to provide a different final composition at each point in the array. The design of the experiment (that is, the particular materials tested in the array) may be done through a software tool to choose the compositions to be chosen for a particular batch experiment.

Once all the precursors are transferred to the reservoirs, mixing is done, for example, using individual stirrers or by placing the reservoir block in a shaker. Typically the mixing is continued for several hours. However, in some embodiments, mixing is done within an hour depending on the reactivity of the precursor materials. In certain embodiments, the apparatus 2 is maintained at ambient temperature. However, in some embodiments, the apparatus is maintained at a temperature of about −40° C. to about 25° C. In solution synthesis method embodiments, once a homogenous mixture is obtained in the reservoirs, the solvent is vaporized, by, for example, heating the apparatus 2 or freeze-drying at cryogenic temperature.

The compositions prepared using the methods in the preceding sections may reversibly absorb and desorb hydrogen. The potential for hydrogen storage in these materials may be detected by a variety of analytical techniques. In some embodiments, all or part of the compositions prepared herein are analyzed in parallel, such that more than one composition is analyzed for hydrogen generation at any time. Measurement of the hydrogen concentration in the material in each of the individual reservoirs can be done directly through chemical analysis of the material. A number of analysis techniques are suitable for direct measurement of hydrogen concentration in a material, including time of flight secondary mass ion spectrometry (ToF-SIMS), laser sputter neutral mass spectrometry (SNMS), Raman spectroscopy, IR spectroscopy, and gas chromatograph mass spectrometer, for example. Measuring hydrogen concentration in the material in each reservoir may also be accomplished by indirect measurement techniques, such as by desorbing the hydrogen from the material, generally by heating to a desorption temperature, and measuring the amount of hydrogen produced during desorption. In some embodiments, the hydrogen is also liberated through decomposition of hydrides. Analytical techniques that can be used to measure the liberation of hydrogen via decomposition and/or desorption from the material in each reservoir include, for example, sensing by a thin film sensor or by infrared (IR) imaging. Use of the thin film sensor technique includes disposing a thin film sensor over the plurality of the materials in the apparatus and heating the apparatus.

The heating of the apparatus in turn heats the plurality of the materials in the reservoirs. In some embodiments, the thin film sensor comprises a thin film sensor comprising tungsten oxide ($WO_3$ and Palladium (Pd). When the apparatus is heated up to release the hydrogen, the $WO_3$ changes color as the hydrogen is liberated from the individual compositions in the reservoirs, thus providing a qualitative measurement of the hydrogen storage capability of the array of the solution synthesized hydrides. In order to use the tungsten oxide as a detector for the hydrogen production in the various compositions of the array, the top surface 6 as shown in FIGS. 1 and 2 is coated with $WO_3$ after the compositions have been prepared.

The ToF-SIMS technique has the capability to detect the absorption and desorption of all elements including hydrogen, which makes it useful for the determining the potential compositions capable of storing a substantial amount of hydrogen. This technique can operate at temperatures of about −100 to about 600° C. and has a high sensitivity to hydrogen, making it a useful tool for investigating the solution synthesized hydrides generated by the array of the plurality of materials.

Thermography or thermal imaging (infrared imaging) may also be used to determine the absorption and desorption of hydrogen. When a material in the reservoir in the apparatus desorbs hydrogen, the local temperature decreases. Thermography can therefore be used to image the compositions that desorb hydrogen.

Desorption of hydrogen often requires thermal cycles. Such thermal cycles can be obtained by the application of electromagnetic fields or by passing electrical current through the material of interest. This can be accomplished in most materials that are electrically conductive. The resistance of these materials changes with the extent of hydrogen storage capacity.

In one embodiment, desorption of stored hydrogen is facilitated by the use of electromagnetic fields. Microwave energy can be directly applied to the plurality of materials, which energy allow for the local release of hydrogen under controlled conditions, without heating the whole system. This method provides a high efficiency of desorption, which generally occurs at temperatures lower than those achieved due to heating brought about by conduction and/or convection.

The methods disclosed herein for rapidly synthesizing, identifying and evaluating the hydrogen storage capacity of a plurality of materials have several advantages. A large number of potential hydrogen storage materials can be screened in a single batch experiment to determine the capability for storing hydrogen, thereby enhancing the new material discovery process for hydrogen storage materials.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for identification and evaluation of the hydrogen storage capacity of materials, said method comprising:
   providing a plurality of materials, wherein said plurality of materials comprise an array of synthesized hydrides; and
   analyzing hydrogen content in said plurality of materials;
   wherein said analyzing comprises analyzing chemical compositions of said plurality of materials:
   wherein said analyzing comprises direct measuring of hydrogen concentration of said plurality of materials: and
   wherein said direct measuring of hydrogen concentration is achieved by a method selected from the group consisting of time of flight secondary mass ion spectrometry, laser sputter neutral mass spectrometry (SNMS), Raman spectroscopy, IR spectroscopy and gas chromatograph mass spectrometer.

2. The method according to claim 1, wherein said synthesized hydrides are made by one of a solution synthesis method and a solid state method.

3. The method according to claim 2, wherein said solid state method includes reacting powders to make said synthesized hydrides.

4. The method according to claim 1, wherein said providing comprises:
   providing at least two precursor materials wherein at least one precursor material comprises a solvent;
   mixing said at least two precursor materials; and
   evaporating said solvent.

5. The method according to claim 4, wherein at least one of said at least two precursor materials comprises a metal hydride.

6. The method according to claim 4, wherein at least one of said at least two precursor materials is a material selected from the group consisting of inorganic salts, organometalic complexes and combinations thereof.

7. The method according to claim 4, wherein at least one of said at least two precursor materials is a material selected from the group consisting of $SiO_2$, $Al_2O_3$, $Nb_2O_3$, $TiO_2$, $Cr_2O_7$, $Cr_2O_3$, $Fe_2O_3$, $MnO_2$, CuO and ZnO.

8. The method according to claim 5, wherein said metal hydride is selected from the group consisting of alkali metal borohydrides, alkali metal and, alkaline earth borohydrides and alkaline earth alanates.

9. The method according to claim 5, wherein said metal hydride is sodium alanate.

10. The method according to claim 4, wherein said solvent is selected from the group consisting of ether and tetra hydro furan (THF).

11. The method according to claim 4, wherein said solvent is an ether.

12. The method according to claim 4, wherein said mixing is achieved at a temperature less than 25 Deg. C.

13. The method according to claim 4, wherein said mixing is achieved at ambient temperature.

14. The method according to claim 4, wherein said evaporating is achieved though one of heating and freeze drying.

15. The method according to claim 1, wherein said analyzing of at least a portion of said plurality of materials is done in parallel.

16. The method according to claim 1, wherein said analyzing comprises indirect measuring of hydrogen concentration in said plurality of materials.

17. The method according to claim 16, wherein said indirect measuring of hydrogen concentration is achieved by one of IR imaging, and sensing by a thin film sensor.

18. The method according to claim 17, wherein said sensing by a thin film sensor comprises:
  disposing said thin film sensor over said plurality of materials; and
  heating said plurality of materials.

19. The method according to claim 18, wherein said disposing thin film sensor comprises disposing a thin film sensor comprising tungsten oxide ($WO_3$) and palladium (Pd).

20. A method for identification and evaluation of the hydrogen storage capacity of a plurality of materials comprising:
  providing a plurality of materials, wherein said plurality of materials comprise an array of synthesized borohydrides;
  adding at least one precursor materials wherein at least one precursor material is selected from the group consisting of $SiO_2$, $Al_2O_3$, $Nb_2O_3$, $TiO_2$, $Cr_2O_7$, $Cr_2O_3$, $Fe_2O_3$, $MnO_2$, CuO and ZnO;
  mixing said synthesized borohydrides and at least one precursor materials; and
  analyzing hydrogen content in said plurality of materials;
  wherein said analyzing comprises analyzing chemical compositions of said plurality of materials;
  wherein said analyzing comprises direct measuring of hydrogen concentration of said plurality of materials: and
  wherein said direct measuring of hydrogen concentration is achieved by a method selected from the group consisting of time of flight secondary mass ion spectrometry, laser sputter neutral mass spectrometry (SNMS), Raman spectroscopy, IR spectroscopy and gas chromatograph mass spectrometer.

21. A method for identification and evaluation of the hydrogen storage capacity of a plurality of materials comprising:
  providing a plurality of materials, wherein said plurality of materials comprise an array of synthesized alanates;
  adding at least one precursor materials wherein at least one precursor material is selected from the group consisting of $SiO_2$, $Al_2O_3$, $Nb_2O_3$, $TiO_2$, $Cr_2O_7$, $Cr_2O_3$, $Fe_2O_3$, $MnO_2$, CuO and ZnO;
  mixing synthesized sodium and at least one precursor materials; and
  analyzing hydrogen content in said plurality of materials;
  wherein said analyzing comprises analyzing chemical compositions of said plurality of materials;
  wherein said analyzing comprises direct measuring of hydrogen concentration of said plurality of materials: and
  wherein said direct measuring of hydrogen concentration is achieved by a method selected from the group consisting of time of flight secondary mass ion spectrometry, laser sputter neutral mass spectrometry (SNMS), Raman spectroscopy, IR spectroscopy and gas chromatograph mass spectrometer.

* * * * *